UNITED STATES PATENT OFFICE.

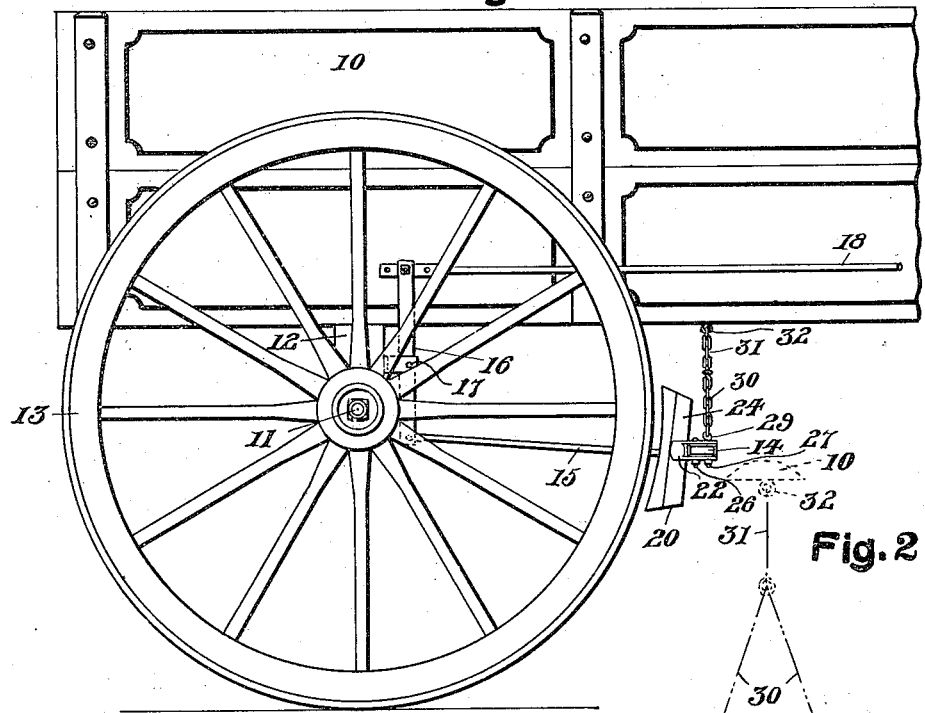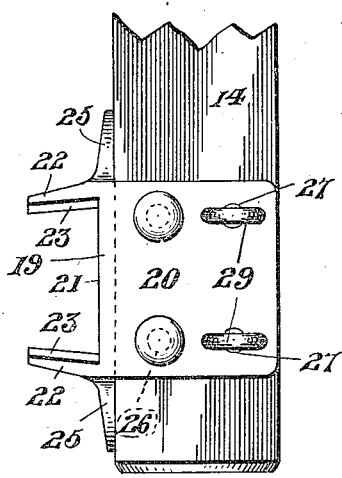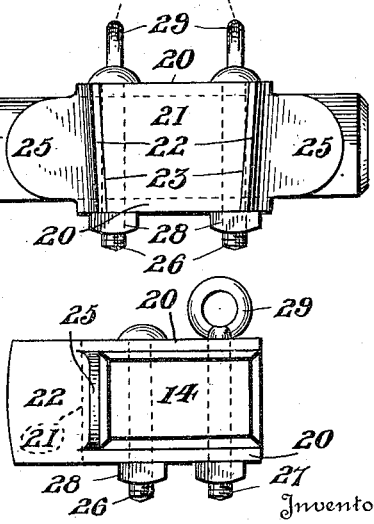

JULIUS C. WILSON, OF DREWSEY, OREGON.

BRAKE-BLOCK IRON.

1,244,678.  Specification of Letters Patent.  Patented Oct. 30, 1917.

Application filed February 9, 1916. Serial No. 77,218.

*To all whom it may concern:*

Be it known that I, JULIUS C. WILSON, a citizen of the United States, residing at Drewsey, in the county of Harney and State of Oregon, have invented certain new and useful Improvements in Brake-Block Irons, of which the following is a specification.

This invention relates to certain new and useful improvements in brake block irons. It being understood that in the employment of wheel-engaging blocks upon brake beams of the usual construction, the continued use of the brake often causes the block carried ends of the beam to split, rendering the beam useless, the present iron is devised for mounting upon the opposite ends of a brake beam, and whereby the shoe may be removably carried thereby and the beam prevented from cracking or splitting.

It is designed by the present provision to provide a mounting iron which is readily secured adjacent the end of a brake beam in a manner to bind the fibers of the beam closely together substantially incased therein for preventing any wear and splitting of the beam and at the same time affording a removable socket for the brake block and a connection for the beam.

The present invention also contemplates a floating brake beam having splitting-preventing block holding irons at its opposite ends, flexible supports connecting the wagon body, and irons whereby the brake rod attached to the beam may be readily employed in operation, the elements of the construction being few and easy to manufacture and the said brake beam iron being efficient in performing their dual functions of supporting the brake beam and blocks and preventing the beam from splitting.

With these general objects in view and others that will appear as the nature of the invention is better understood, the same consists in the novel combination and arrangement of parts to be hereinafter more fully described, illustrated in the accompanying drawings, and pointed out in the appended claims.

In the drawings forming a part of this application and in which like-designating characters refer to corresponding parts throughout the several views:—

Figure 1 is a side elevation of the rear portion of a wagon provided with the present device.

Fig. 2 is a rear elevation of one end of the brake beam provided with the present form of iron, the suspending means being illustrated in dotted lines.

Fig. 3 is a top plan view thereof, and Fig. 4 is an end elevation of the same.

The invention is herein illustrated in connection with a wagon of the usual form known as a truck wagon although it will be understood that the device may be readily employed with any form of vehicle. The said wagon is provided with the wagon box 10 mounted upon the rear axle 11 by means of a bolster 12, the rear wheels 13 being revolubly journaled upon the opposite ends of the axle in the ordinary manner.

A brake beam 14 is provided rectangular in cross section and formed of an extremely strong kind of wood and arranged transversely beneath the wagon body or box 10 and forwardly of the rear wheels 13.

An operating rod 15 is rigidly secured forwardly to the beam 14 and has its rear end pivoted to the lower swinging end of an operating lever 16 pivoted substantially centrally to a lug 17 carried upon the front side of the afore-mentioned bolster 12. A pull rod 18 is adjustably pivoted at its rear end to the upper end of the lever 16 and whereby the brake beam 14 may be shifted toward or away from the wheels 13 as may be found desirable when operating the brakes.

The gist of the present invention resides in the bracket or brake beam iron 19 of the form herein set forth and designed for the removable attachment of the brake shoe 20 to the beam 14, a bracket 19 being arranged adjacent the opposite ends of the beam 14 and in alinement therewith forwardly thereof.

This form of bracket iron 19 is arranged with a substantially U-shaped portion adapted to fit over the beam 14 for inclosing the three sides thereof, the opposite parallel side plates 20 of the bracket flatly engaging the top and bottom faces of the beam 14, while the intermediate connecting side 21 of the bracket flatly engages the rear face of the beam. The face 21 of the bracket is arranged with opposite spaced ears 22 converging outwardly and having their inner faces 23 converging downwardly, the said ears forming ways and arranging a receiving socket upon the bracket 19 adapted for the removable wedging reception of the brake block 20, it being understood that the base portion 24 of the brake block is correspondingly formed, so as to be wedgingly received between the ears 22 of the bracket.

Substantially semi-circular tapered lips 25 are arranged on opposite sides of the bracket 19 in substantial alinement with the connecting side 21 thereof and merging into the said ears 22 at the outer faces thereof. The lips 25 flatly engage the rear face of the beam 14, while the bracket 19 is secured in position by means of bolts 26 and 27 arranged substantially vertically through the bracket plates 20 and intervening portion of the beam 14, lock nuts 28 being arranged thereon and whereby the end portion of the beam 14 is firmly secured within the bracket and with the rods 25 in flat engagement with the rear face thereof.

The bolts 27 have rings 29 carried by their upper head ends and suspending chains 30 are attached to the rings 29 and connected by means of a short-length chain 31 to the adjacent lower edge of the wagon box 10 as as 32.

One of the brackets 19 is secured to each of the opposite ends of the beam 14 in the position best illustrated in Figs. 2 and 3 of the drawings, and chains 30 and 31 are supportingly connected between the bolt eyes 29 and the wagon box 10. The blocks 20 are seated between the bracket ears 22 and by reason of the forward and downward convergence of the said ears, the said blocks are wedgingly retained therein. By longitudinally moving the pull rod 18, the operating rod 15 is shifted thereby laterally moving the brake beam 14 for engaging the rear curved faces 33 into and out of frictional engagement with the wheel 13.

It will thus be seen that the bracket irons 18 upon the beams 14 perform the dual function of strengthening the beam ends and preventing the same from splintering and shattering after prolonged use and also afford support for the beam permitting the operating rod to advantageously perform its function.

While the form of the invention herein shown and described is what is believed to be the preferred embodiment thereof, it is nevertheless to be better understood that minor changes may be made therein without departing from the spirit and scope of the invention as claimed.

What I claim as new is:—

An article of manufacture comprising a cast one-piece bracket for brake beams having integral opposite attaching sides and a connecting plate adapted for flatly inclosing three sides of a beam, outwardly projecting spaced downwardly and inwardly converging block-receiving ears integral with said plate and arranged transversely of the said plate, opposite lips integral with said plate and adapted for flatly engaging a face of a brake beam, the said lips flaring inwardly and merging with the outer faces of the said ears, the ears being of the same width as the said plate and the inner face of the plate being in alinement with the inner faces of the lips.

In testimony whereof I affix my signature.

JULIUS C. WILSON.

Copies of this patent may be obtained for five cents each, by addressing the "Commissioner of Patents, Washington, D. C."